Sept. 4, 1951 L. C. FRAZIER ET AL 2,567,150
APPLICATOR FOR TIRE BUILDING OR OTHER MACHINES
Filed Nov. 18, 1949 5 Sheets-Sheet 1
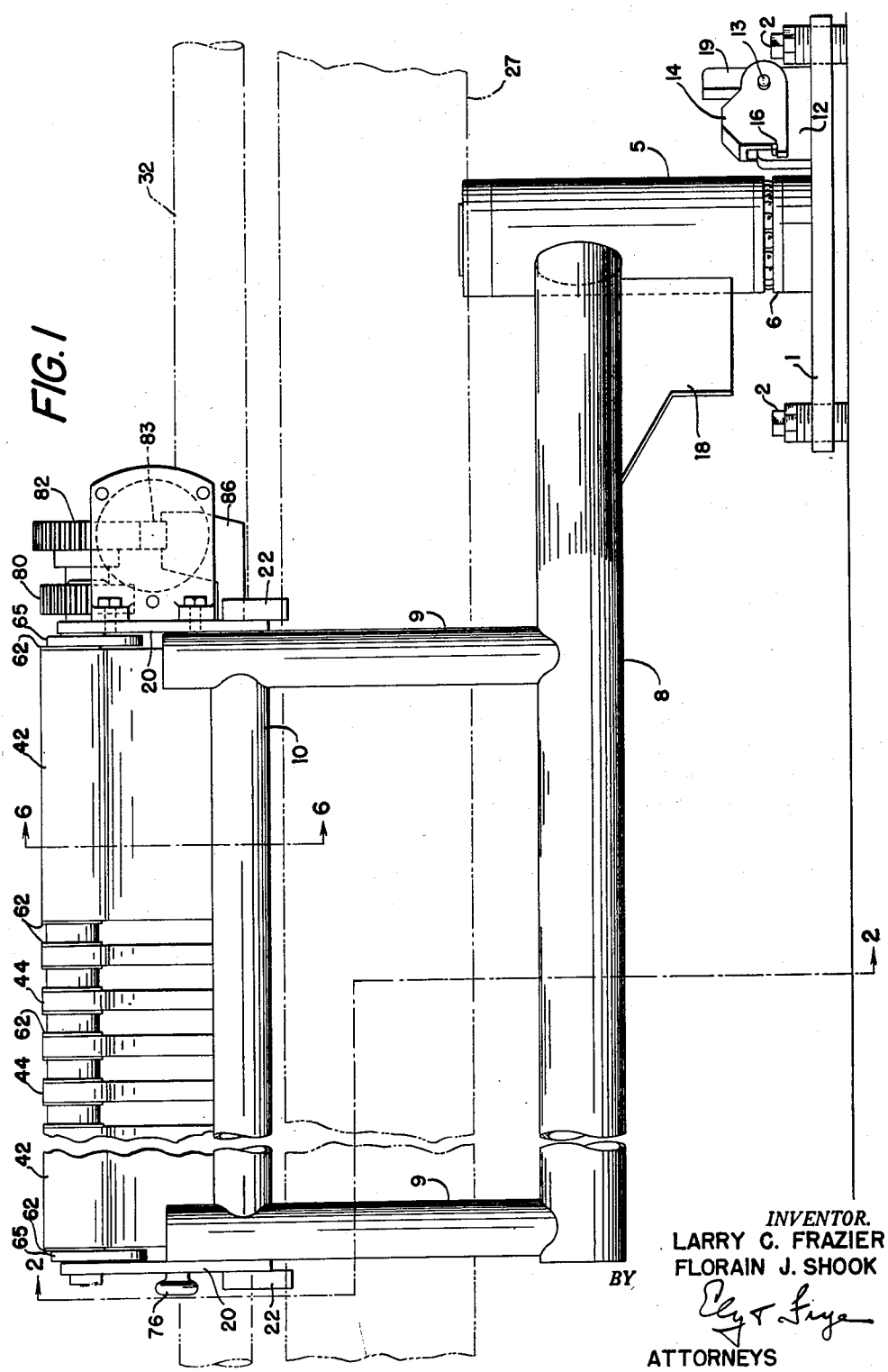
INVENTOR.
LARRY C. FRAZIER
FLORAIN J. SHOOK
BY
ATTORNEYS

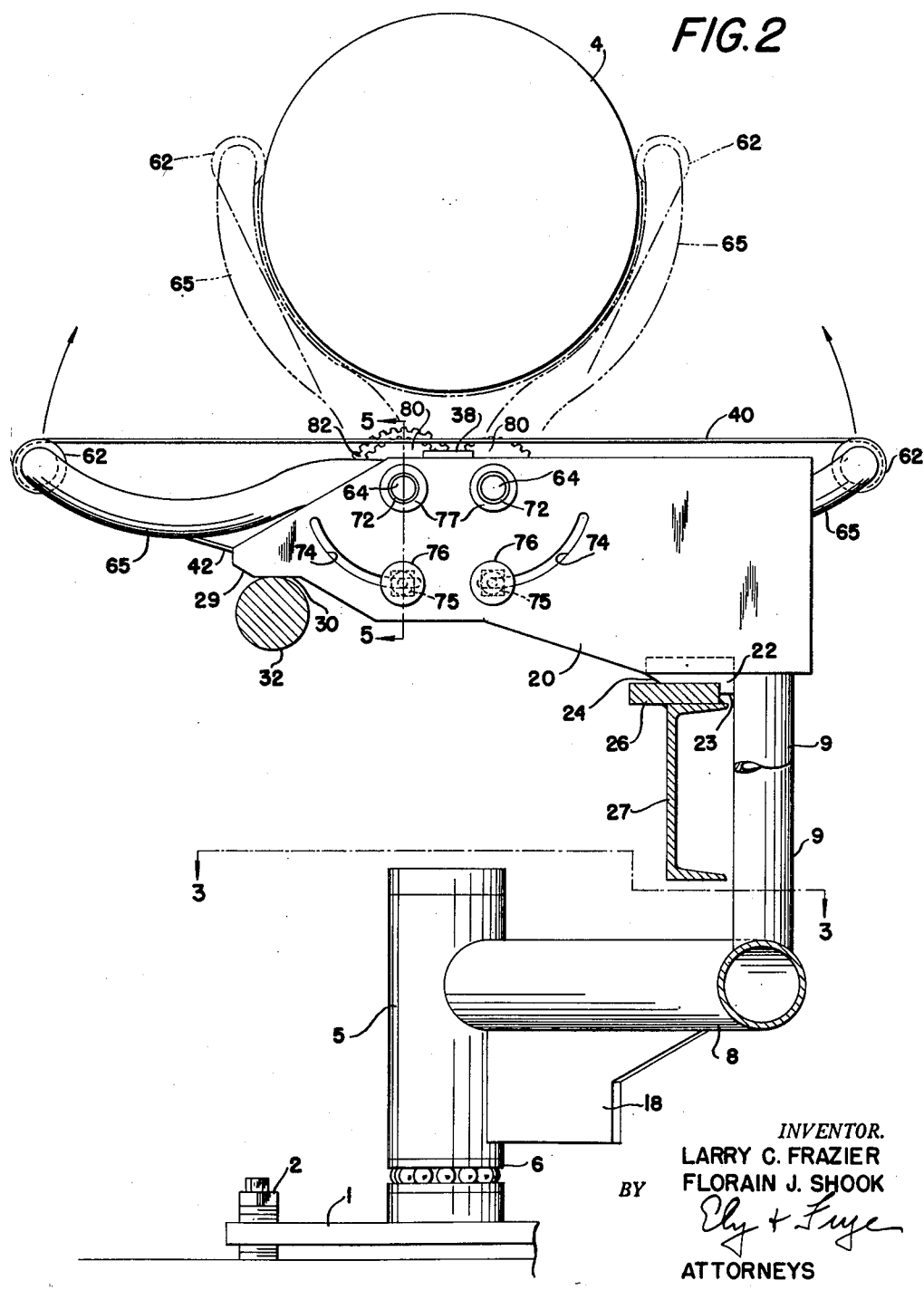

Sept. 4, 1951  L. C. FRAZIER ET AL  2,567,150
APPLICATOR FOR TIRE BUILDING OR OTHER MACHINES
Filed Nov. 18, 1949  5 Sheets-Sheet 3
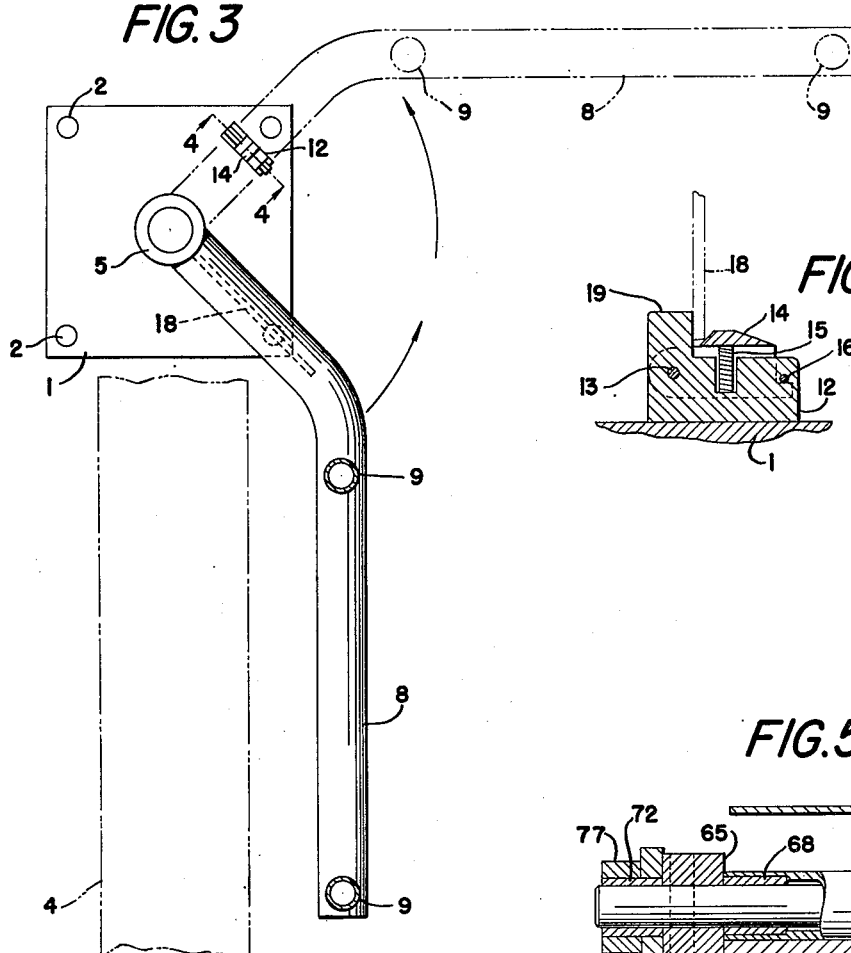
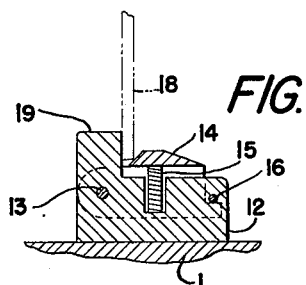
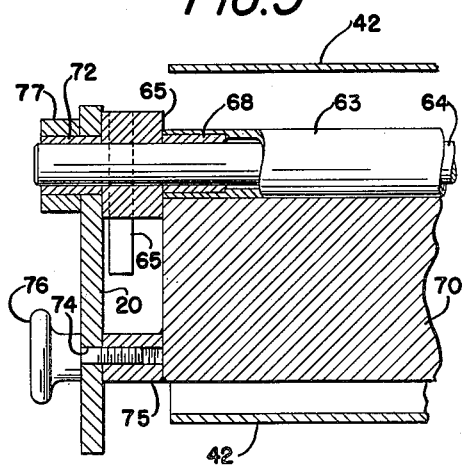
INVENTOR.
LARRY C. FRAZIER
FLORAIN J. SHOOK
BY
ATTORNEYS Sept. 4, 1951   L. C. FRAZIER ET AL   2,567,150
APPLICATOR FOR TIRE BUILDING OR OTHER MACHINES
Filed Nov. 18, 1949   5 Sheets-Sheet 4

INVENTOR.
LARRY C. FRAZIER
FLORAIN J. SHOOK
BY Ely & Frye
ATTORNEYS

Sept. 4, 1951  L. C. FRAZIER ET AL  2,567,150
APPLICATOR FOR TIRE BUILDING OR OTHER MACHINES
Filed Nov. 18, 1949  5 Sheets-Sheet 5
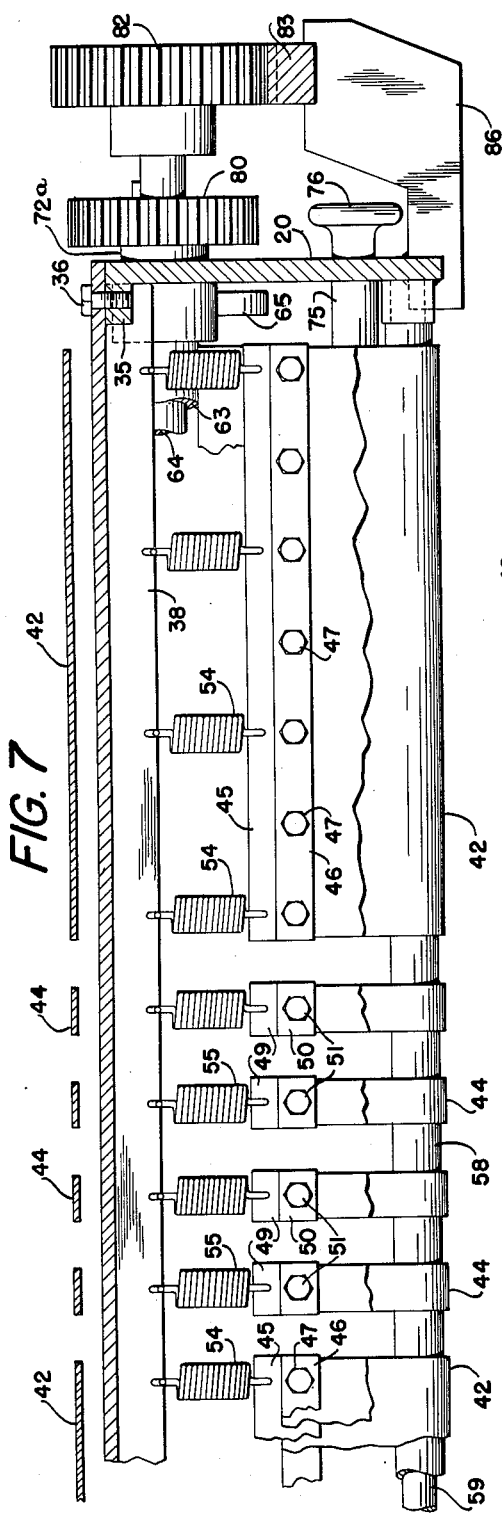
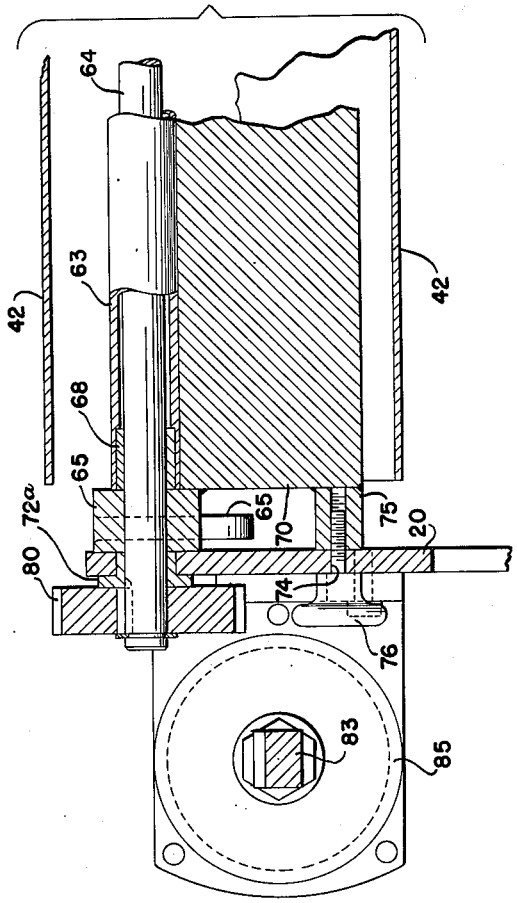
*INVENTOR.*
LARRY C. FRAZIER
FLORAIN J. SHOOK
BY
ATTORNEYS Patented Sept. 4, 1951

2,567,150

UNITED STATES PATENT OFFICE 2,567,150

APPLICATOR FOR TIRE BUILDING OR OTHER MACHINES

Larry C. Frazier, Niles, Mich., and Florain J. Shook, Akron, Ohio, assignors to National-Standard Company, Niles, Mich., a corporation of Michigan Application November 18, 1949, Serial No. 128,186

16 Claims. (Cl. 154—9)

1

The present invention relates to an apparatus for applying sheet or strip materials to cylindrical objects. While the invention is not limited to the purpose specifically described herein, the primary object of the invention is to devise a simple and effective means of applying tire building fabric to the surface of a tire building drum. It is also employed to apply the tread strip to the outer surface of the completed tire carcass.

The apparatus shown and described herein was particularly designed for use in conjunction with an automatic tire building machine of the type designed by the applicant Larry C. Frazier, for which application for Patent Serial No. 124,225 was filed October 28, 1949, now Patent No. 2,565,071, granted August 21, 1951. The tire building machine referred to comprises a long cylindrical drum comprised of a main and auxiliary drums arranged in axial alignment. The fabric strip which is applied to the drum as the first step in the process of tire building is of sufficient width to overlap the auxiliary drums to a very considerable extent, which would render difficult the even and regular application of fabric by known means or methods.

With the use of the apparatus shown and described herein, exceptionally wide plies of fabric may be applied quickly and smoothly, the only manual labor which is required being the initial laying of the fabric on the top surface of the applicator while in flattened condition, and the splicing of the ends of the material after it is wrapped about the drum.

It was also found that the same applicator was adaptable for applying the rubber tread strip to the carcass, and the mechanism is so designed that it is equally useful for either operation.

While the invention is intended and designed for use in the tire building industry, it may have other uses and it is therefore to be understood that the invention is not confined to that particular field. It will also be understood that the applicator which is shown may be used with tire building machines other than that designed by the applicant Frazier.

The applicator forming the subject of the present invention is shown and described in the form in which it has been perfected but the invention and the claims appended hereto are not limited to the details which are given but may be modified, varied, or improved within the scope of the invention as set forth in the claims.

In illustrating and describing the invention, certain parts of the tire building machine are shown as may be necessary for an understanding of the invention and its relationship to the main tire building machine.

In the drawings in which the best known and preferred form of the invention is illustrated in sufficient detail to enable its construction and operation to be understood:

Fig. 1 is a side elevation of the machine which is shown in the position to apply the sheet material to the drum or other object.

Fig. 2 is an end view and partial section on the line 2—2 of Fig. 1.

Fig. 3 is a horizontal section on the line 3—3 of Fig. 2.

Fig. 4 is a detail section on the line 4—4 of Fig. 3.

Fig. 5 is a fragmentary section on the line 5—5 of Fig. 2.

Fig. 7 is a section on the line 7—7 of Fig. 6.

Fig. 8 is a section on the line 8—8 of Fig. 6.

Figure 6:
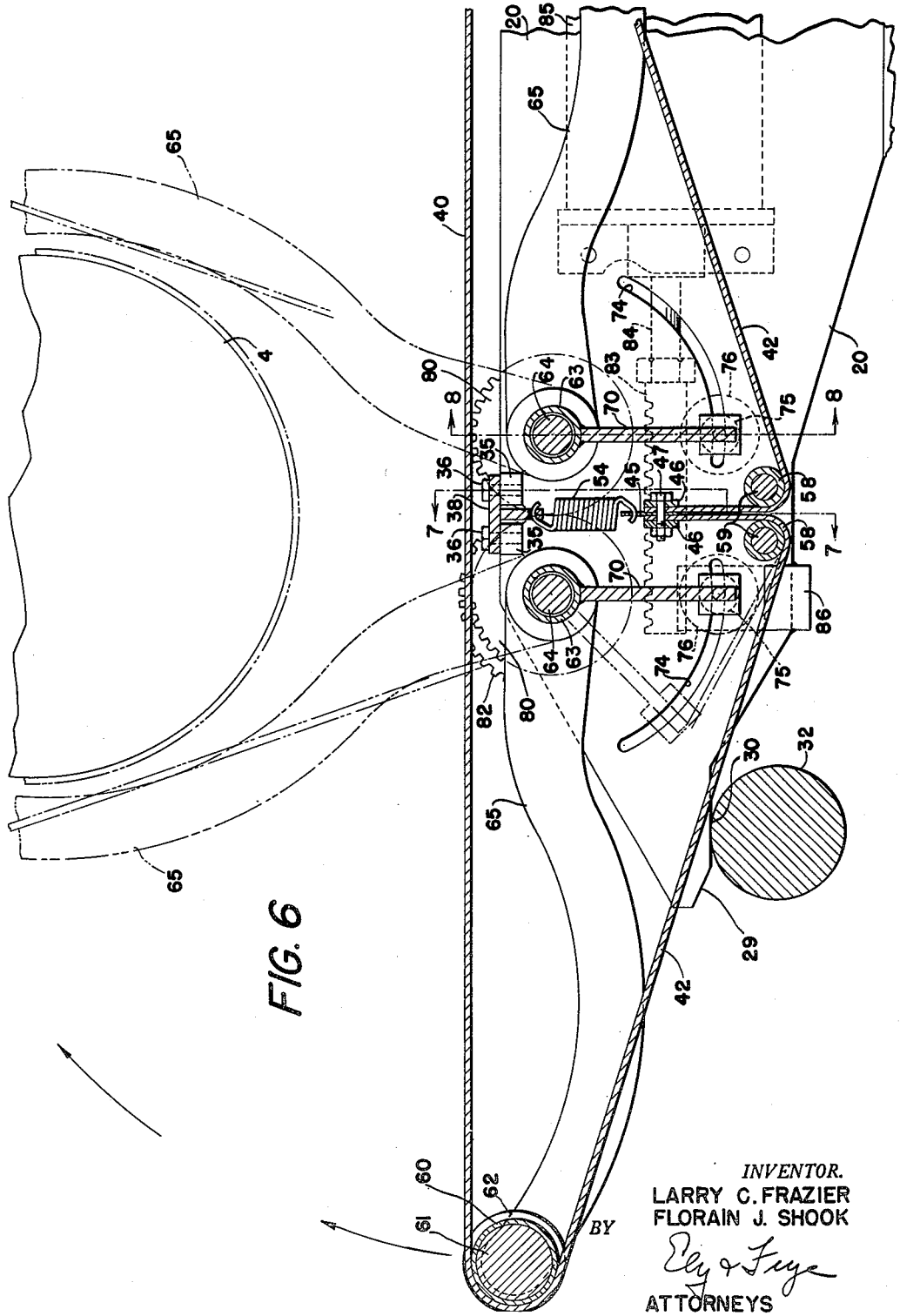
Fig. 6 is an enlarged section on the line 6—6 of Fig. 1, the full lines showing the belt or supporting surface in flat condition and the dotted lines showing the belt raised and enfolding the tire building drum.

In the form of the invention shown herein the applicator is supported on a base plate 1 which is secured to the floor or other support by jack screws 2, which allow for any unevenness of the floor and for vertical adjustment of the applicator unit with respect to the drum or other object to which the material is to be applied. A drum, such as a tire building drum, is shown in outline at 4 in Figs. 2 and 6.

Swivelled on the base plate 1 is a vertical stanchion 5, preferably supported on a frictionless bearing 6 and having a laterally extending arm 8 from which rise the two vertical posts 9 which are braced by the cross bar 10.

The applicator is arranged to be moved from a position at the side of the building drum where the operator may conveniently lay the strips of sheet material thereon to a position below and centered with respect to the drum for the transfer of the material from the applicator to the drum. The operator will place the strip material on the applicator during the period that the tire making operations are being performed on the drum, and when the drum is ready to receive the material for the next operation the applicator will be swung to the position shown in Fig. 6.

To hold the applicator in its position remote from the drum, the base plate is provided with a block 12 in which is pivoted at 13 a catch 14 urged upwardly by spring 15 against a stop pin 16. The upper surface of the catch is beveled as shown in Fig. 4, and the swinging arm 8 is provided with a downwardly extending plate 18 which passes over and depresses the catch 14 as the applicator is moved to its idle position. An abutment 19 on the block 12 arrests the backward movement of the applicator.

Welded to the upper ends of the posts 9 are the two parallel, vertically arranged plates 20 which constitute the carriage forming the body of the applicator. Fixed to the lower side of the plates 20 are two notched stop plates 22, each provided with a shoulder 23. When the applicator is moved into its operating or working position, the stop plates 22, which are beveled at their outer ends as shown at 24, ride over a support here shown as a horizontal rail 26 mounted on the upper surface of a channel 27 forming a part of the tire building machine. The front or outer end of each plate 20 is also beveled as at 29 and provided with a horizontal rest 30 so that, as the carriage moves to its working position, it rests at its extreme outer end on a shaft 32 which is a part of the tire building machine. (See Figs. 2 and 6.) This provides a firm support for the applicator when in its operating position but any other means may be provided for this purpose.

Formed on each plate 20 and located below the axis of the tire building drum 4 are two spaced lugs 35. Across the applicator and fastened to the lugs by screws 36 is a T-shaped bar 38 which forms an anchorage for the belt element indicated as a whole by the numeral 40, which constitutes the upper flexible surface on which the strip material is laid and by which it is wrapped about the drum.

While this element 40 may be a single belt if sheet material of even thickness is to be applied to a plain cylindrical surface, the preferred form shown is made so that it will accommodate a strip of uneven thickness, such as a tread strip which is formed with a thicker central area. In applying such a strip, the application of the uneven layer to a transversely flat surface, such as a tire building drum, requires that the belt give to compensate for the irregular cross-section of the tread. Therefore, the element 40 is designed for this purpose and will operate satisfactorily either with tire fabric plies or tread strips.

The element 40 as shown herein is composed of two wide belts 42 located at either side of the applicator and spaced apart to accommodate a number of narrower belts 44 which are distributed over a sufficient area to allow for the added thickness at the center of a tread strip.

Each belt, whether the wide type 42 or the narrow type 44, is not continuous, the ends thereof being brought together and clamped together. In the case of the units 42, each belt is clamped to a long bar 45 located between the ends of the belt and held by clamping plates 46 and bolts 47. In the case of each unit 44, the ends of a narrow belt are clamped to a similar short bar 49, located between the ends of the belt and held by a short clamping plate 50 and bolts 51.

The plates 45 are suspended from the T-bar 38 by coil springs 54 and each short plate 49 is suspended from the same bar by a coil spring 55. All of the belts are trained about two long sleeves 58 mounted on shafts 59 extending across the carriage between the vertical side plates 20. From the sleeves 58 the belts extend outwardly on either side of the center of the carriage and are trained over guiding sleeves 60, each of which is mounted on a transverse shaft 61, the outer surface of the sleeves 60 being formed with guiding ribs 62 which keep the belts in proper spaced and aligned relation.

Each shaft 61 is secured to the outer ends of a pair of swinging arms 65 which extend to either side of the center of the applicator carriage, the arms being so proportioned and designed that when they are extended outwardly or in horizontal position as shown in Fig. 6, the composite belt is taut and the upper surface lies in a horizontal plane. Each arm 65 is bent as shown in the drawings so that the arms encompass the drum when in the raised position shown in dotted lines in Figs. 2 and 6.

As shown in the several views, the upper surface of the composite belt lies considerably below the drum when in horizontal position ready for the application of the strips to the drum, but as the arms are raised the center of the belt is lifted into position so that the material lying on the belt is pressed against the underside of the drum and, as the arms continue to rise, the belt is wrapped about the drum, pressing the material into contact with the drum. It will be noted that when the arms are raised there is a considerable area exposed over the top of the drum and it will also be noted that the area of the belt between the sleeves 60 is somewhat shorter when the arms are raised than when they are in horizontal position. While a strip of tire fabric may, due to the fact that the ends thereof are cut on the bias, hang over slightly beyond the ends of the horizontal portion of the belt, when the arms are raised, the shortening of the upper surface of the belt will expose sufficient of the ends of the fabric layer at the top of the drum to enable the operator to complete most of the splice while the arms are elevated. The remainder of the splicing operation may be done after the arms are returned to their lowered position. In the case of a tread strip, the splice is usually straight across the drum.

Located at the centers of rotation of the arms 65 are sleeves 63 supported on shafts 64 by bushings 68. The shafts 64 extend outwardly on either side of the sleeves and are welded to the inner ends of the arms 65. Also welded to the sleeves 63 and to the arms 65 are downwardly extending vertical ribs 70. Each extremity of a shaft 64 is mounted in a rotatable bearing sleeve 72 or 72a set in a plate 20 near the top thereof, and below these sleeves arcuate slots 74 are cut in the plates 20 to provide guides for the ribs 70 in their swinging movements. A sleeve 75 is welded to each lower corner of rib 70 and in each sleeve is threaded the shank of a guiding pin 76.

At one end of each shaft, shown in Fig. 5, the sleeve 72 is held by a collar 77. At the other end the sleeve 72a is flanged as shown in Fig. 8 and against this flange is located a spur gear 80 keyed to the shaft 64. The two gears 80 on the shafts 64 are in mesh and on one of the gears 80, shown to the left in Fig. 6, is fixed a driving gear 82 by which the arms are raised and lowered, preferably by fluid pressure under control of the operator as he stands at the machine.

The gear 82 is in mesh with a rack 83 on the end of a piston 84 movable in a cylinder 85 mounted at one side of the carriage, the outer end of rack 83 being guided in the end of a bracket 86 also mounted on the side of the carriage by welding to the adjacent plate 20.

In operating the mechanism the tire builder lays the sheet material, either tire fabric or a tread strip, on the upper surface of the composite belt 40 while the applicator is in the dotted line position shown in Fig. 3. In order to center the strips of material on the belt, any suitable guides or stops (not shown) may be associated with the belt. When the drum is ready to receive the material, the applicator is swung to the full line position shown in Fig. 3, with the upper surface of the belt centered and below the drum 4. He then operates a valve located at a convenient position and the rack 83 moves outwardly, which, through the connection to the shafts 64, raises the arms 65 and wraps the material on the belt about the drum. After the splice is made on the upper surface of the drum, the rack is reversed and the arms 65 are lowered. The applicator carriage moves out of the way so that the further operation of building the tire may go forward.

It will be seen that a highly efficient, labor-saving device has been perfected which applies a layer of sheet material about the drum smoothly and evenly. The material is not under any longitudinal strain as it is applied, so that there is no distortion of the material during application. In the manufacture of tires from cord fabric which has very little resistance to longitudinal strain, this method of application has the advantage of laying the fabric over the drum without distortion so that the cords are not displaced, as is often the case with other devices for applying fabric to tire building drums. The fabric when applied lays smoothly and evenly over the drum.

The invention, therefore, not only has merit as a labor-saving device, but it also improves the qualities of the product due to the fact that the material is wrapped about the drum without the exertion of any stresses whatsoever. Other advantages flow from the use of this improved device as will be apparent to those conversant with the art to which the invention is particularly directed. It is especially useful for applying strips of tire fabric of great width about a drum, strips of the width used in machines of the type indicated being difficult to handle without distorting or disrupting the delicate cord fabric which offers very little resistance to handling.

While it is preferred to use a composite belt of the type described so that the applicator may be used for tire fabric or for tread strips, a one-piece belt may be used. The multiple belt makes the machine adaptable for use with material of uneven thickness or with drums of other than straight cylindrical form.

What is claimed is:

1. Apparatus for applying tire building stock to a tire building drum, a carriage positioned adjacent the drum, a flexible belt on the carriage adapted to support a strip of tire stock, and means on the carriage to hold a portion of the belt in substantially flat condition and to bring the center of the belt into contact with the drum and to wrap the belt about the drum.

2. Apparatus for applying tire building stock to a tire building drum, a carriage movable to a position below the drum, a flexible belt having a substantially flat portion forming the upper surface of the carriage, and means to wrap said belt around the drum.

3. Apparatus for applying tire building stock to a tire building drum, a carriage movable to a position below the drum, a flexible belt having a substantially flat portion forming the upper surface of the carriage, and means operable in a single movement to raise the belt in contact with the drum and wrap it about the drum.

4. Apparatus for applying tire building material to a building drum comprising a substantially flat flexible supporting surface adapted to receive a sheet of said material and to hold the same in a position adjacent to but spaced from the drum, and means to cause said flexible supporting surface to approach the drum and enfold the outer surface of the drum.

5. Apparatus for applying tire building material to a building drum comprising a substantially flat flexible supporting surface adapted to receive a sheet of said material and to hold the same in a position adjacent to but spaced from the drum, and means to cause said flexible supporting surface to contact the drum and progressively enfold the outer surface thereof.

6. Apparatus for applying a sheet of material to a drum, comprising a carriage, a flexible belt on said carriage, arms on said carriage about which said belt is looped, and means to move said arms to flex the belt and shift it from a horizontal position to a position surrounding the drum.

7. Apparatus for applying a layer of material to a drum comprising a carriage, a flexible belt the ends of which are anchored to the carriage, arms over which the belt is looped, said arms when in one position holding the upper surface of the belt in a horizontal plane spaced from the drum, and means to raise the arms to a position in which they envelop the drum and press the belt against the surface thereof.

8. Apparatus for applying a layer of material to a drum comprising a carriage positionable beneath the drum, a flexible belt the ends of which are anchored to the carriage, swinging arms over which the belt is trained, said arms when in lowered position holding the upper surface of the belt in a horizontal plane spaced below the drum, and means for swinging said arms upwardly simultaneously to lift the center of the belt into contact with the drum and then to wrap the belt about the drum.

9. Apparatus for applying a layer of material to a drum comprising a carriage, a flexible belt, yielding means to anchor the ends of the belt to the carriage, arms located in the loop formed by the belt, said arms in one position holding the belt in a plane beneath the drum, and means to raise the arms to lift the center of the belt into contact with the underside of the drum and to wrap the upper surface of the belt about the drum.

10. Apparatus for applying a layer of tire building stock to a tire building drum comprising a carriage, a composite flexible belt having side strips and central strips separate therefrom, yielding means to anchor the ends of all of said strips to the carriage, arms located in the loop formed by the composite belt, and means to raise said arms to bring the belt into contact with the underside of the drum and to wrap the belt about the drum.

11. Apparatus for applying a layer of tire building stock about a tire building drum, comprising a carriage movable toward and from a position beneath the drum, a flexible stock supporting element mounted on the carriage and spaced from the drum when the carriage is beneath the drum, and means to raise said element into contact with the drum and progressively bring the element into enveloping relation to the drum.

12. Apparatus for applying a layer of material to a drum comprising a flexible support beneath and spaced from the drum, and means to lift said support into contact with the underside of the drum and thereafter progressively wrap said support about said drum.

13. Apparatus for applying a layer of tire building stock about a tire building drum, comprising a carriage movable toward and from a position beneath the drum, a flexible stock supporting element mounted on the carriage, and means to raise said element into contact with the drum and progressively bring the element into enveloping relation to the drum, said means comprising two swinging arms located in the loop of said element and means to raise said arms simultaneously.

14. Apparatus in accordance with claim 12 in which the flexible support is composed of separate belts which yield independently of one another to accommodate layers of material having irregular cross-sectional contours.

15. In an apparatus for applying a layer of tire building stock to a building drum, the combination of a carriage movable to a position beneath the drum, arms on the drum, means to move the arms simultaneously from a horizontal position to a position surrounding the drum, and a flexible belt anchored to the carriage, said belt being looped about the ends of the arms, the upper surface of said belt being below but spaced from the drum when the said arms are in horizontal position.

16. In an apparatus for applying a layer of tire building stock to a building drum, the combination of a carriage movable to a position beneath the drum, arms on the drum, means to move the arms simultaneously from a horizontal position to a position surrounding the drum, and a flexible belt yieldingly anchored to the carriage, said belt being looped about the ends of the arms, the upper surface of said belt being below but spaced from the drum when the said arms are in horizontal position.

LARRY C. FRAZIER.
FLORAIN J. SHOOK.

REFERENCES CITED

The following references are of record in the file of this patent:

UNITED STATES PATENTS

| Number | Name | Date |
| --- | --- | --- |
| 2,376,494 | Larabee | May 22, 1945 |
| 2,385,456 | Marcy | Sept. 25, 1945 |
| 2,489,387 | Roberts | Nov. 29, 1949 |